United States Patent
Chen et al.

(10) Patent No.: US 7,949,115 B2
(45) Date of Patent: May 24, 2011

(54) PROVIDING A SERVICE FRAMEWORK AT AN ENDPOINT

(75) Inventors: Henry Chen, Plano, TX (US); Michael H. McClung, Earlysville, VA (US); Jeffery A. Sanders, Cocoa, FL (US)

(73) Assignee: Cisco Technology, Inc., San Jose, CA (US)

( * ) Notice: Subject to any disclaimer, the term of this patent is extended or adjusted under 35 U.S.C. 154(b) by 1569 days.

(21) Appl. No.: 10/982,636

(22) Filed: Nov. 4, 2004

(65) Prior Publication Data

US 2006/0093115 A1    May 4, 2006

(51) Int. Cl.
*H04M 3/42* (2006.01)

(52) U.S. Cl. ........... 379/201.02; 379/93.05; 379/201.12; 379/202.01; 379/207.02; 379/207.06; 379/207.07

(58) Field of Classification Search ............... 379/93.05, 379/202.01, 201.01, 201.02, 201.12, 207.02, 379/207.06, 207.07; 719/317
See application file for complete search history.

(56) References Cited

U.S. PATENT DOCUMENTS

| | | | |
|---|---|---|---|
| 6,519,617 B1 | 2/2003 | Wanderski et al. | 707/513 |
| 6,614,899 B1 | 9/2003 | Sollee et al. | 379/218.01 |
| 6,622,015 B1 | 9/2003 | Himmel et al. | 455/414 |
| 6,674,725 B2 | 1/2004 | Nabkel et al. | 370/252 |
| 6,744,759 B1 * | 6/2004 | Sidhu et al. | 370/356 |
| 7,299,257 B2 * | 11/2007 | Boyer et al. | 709/204 |
| 2002/0143876 A1 | 10/2002 | Boyer et al. | |
| 2003/0023759 A1 * | 1/2003 | Littleton et al. | 709/248 |

OTHER PUBLICATIONS

International Telecommunication Union, "Series Q: Switching and Signalling, Intelligent Network, Distributed functional plane for intelligent network Capability Set 2: Part 1" ITU-T Telecommunication Standardization Sector of ITU, 28 pages, Sep. 1997.
European Patent Office Communication, Supplementary European Search Report and Annex to the European Search Report; Application No. 05824160.5—2414 / 1808004; Ref. P30024EP-PCT dated Jul. 7, 2010 forwarded by foreign associate to Baker Botts on Aug. 19, 2010; 6 pages.
State Intellectual Property Office of the People's Republic of China, the First Office Action and Text of the First Office Action, Application No. 200580030888.2, dated Sep. 1, 2010 forwarded by foreign associate to Baker Botts on Jan. 10, 2011; 13 pages, Reported Jan. 10, 2011.

* cited by examiner

*Primary Examiner* — Melur Ramakrishnaiah
*Assistant Examiner* — Yosef K Laekemariam
(74) *Attorney, Agent, or Firm* — Baker Botts L.L.P.

(57) ABSTRACT

A method for providing telephony features at an endpoint includes accessing a service framework at an endpoint. The service framework is operable to provide one or more telephony features. Feature logic associated with a first telephony feature is accessed. The feature logic specifies a plurality of actions for implementing the first telephony feature. The first telephony feature is registered to receive an intercept upon the occurrence of an event. The occurrence of the event for which the first telephony feature is registered is identified. The event initiates a transition from a first state to a second state. The feature logic associated with the first telephony feature is loaded to provide the first telephony feature.

24 Claims, 2 Drawing Sheets

US 7,949,115 B2

PROVIDING A SERVICE FRAMEWORK AT AN ENDPOINT

TECHNICAL FIELD

This invention relates generally to the field of communications and more specifically to providing a service framework at an endpoint.

BACKGROUND

As communications technologies develop, voice services and data services have increasingly converged. One such example is the use of Internet protocol (IP) technology to transport voice data. The use of IP technology enables voice traffic to gain the benefits of packet communication protocols. Similarly, other technologies may provide benefits when applied to telephony systems. Discovering appropriate technologies and uses for these technologies, however, remains a daunting challenge.

SUMMARY OF THE DISCLOSURE

In accordance with the present invention, disadvantages and problems associated with previous techniques for providing integrated service features may be reduced or eliminated.

According to one embodiment, a method for providing telephony features at an endpoint includes accessing a service framework at an endpoint. The service framework is operable to provide one or more telephony features. Feature logic associated with a first telephony feature is accessed. The feature logic specifies a plurality of actions for implementing the first telephony feature. The first telephony feature is registered to receive an intercept upon the occurrence of an event. The occurrence of the event for which the first telephony feature is registered is identified. The event initiates a transition from a first state to a second state. The feature logic associated with the first telephony feature is loaded to provide the first telephony feature.

Certain embodiments of the invention may provide one or more technical advantages. A technical advantage of one embodiment may be that integrated service features may be provided at an endpoint. In particular embodiments, the endpoint may include an interface to the Internet through a service framework. Users of the endpoint may use the service framework interface to enhance or modify default platform behavior to create call and key features. In particular embodiments, the endpoint may include intelligence incorporating a SIP framework and VOIP technology. Another technical advantage may be that the endpoint may support services implemented using feature logic. Accordingly, logic instructions may be created at a user's request. A further technical advantage may be that the logic instructions may operate to provide customized features that provide services such as hold requests, transfer requests, multiple calls per line, shared lines, video, instant messaging, or other telephony services.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
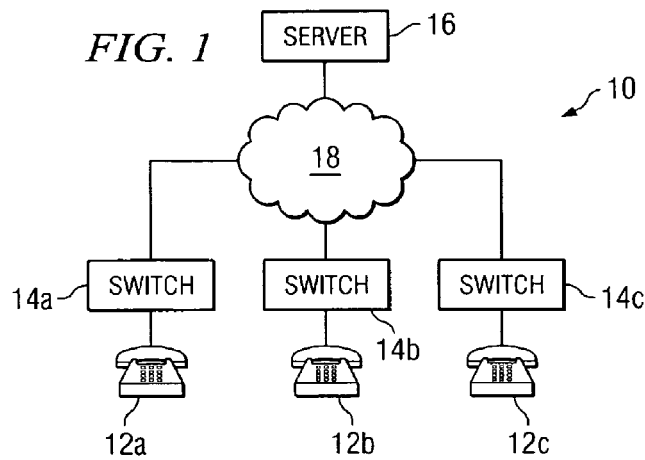
FIG. 1 is a block diagram of one embodiment of a system that includes endpoints.

FIG. 1 is a block diagram of one embodiment of a system 10 that includes endpoints 12. According to the embodiment, an endpoint 12a may include a service framework for creating, integrating, and handling interaction of telephony features at endpoint 12a. In particular, endpoint 12a may supply an interface to the Internet through an internal service logic execution environment. As a result, endpoint 12a may be able to support scripted services that allow a user of endpoint 12a to modify the default behavior of endpoint 12a for basic call and key features. For example, the service framework may offer customized services for handling hold requests, multiple calls per line, shared lines, or other telephony features.

According to the illustrated embodiment, system 10 includes one or more endpoints 12, one or more switches 14, a server 16, and a communications network 18 coupled as shown. An endpoint 12 represents any suitable combination or arrangement of logic for providing communication services such as telephony services. Logic may refer to hardware, software, or any combination of hardware and software. Examples of an endpoint 12 include a communication device such as a telephone, a cell phone, a personal digital assistant, a voice appliance, an answering machine, a facsimile machine, a computer, or other device. An embodiment of an endpoint 12 is described in greater detail with reference to FIG. 2.

Referring to FIG. 1, an endpoint 12 may provide certain telephony features. Specifically, users of the endpoint 12 may use the service framework interface to enhance or modify default platform behavior in a way that creates call and key features. Accordingly, feature logic, such as scripted instructions, may operate to provide customized features with respect to hold requests, transfer requests, multiple calls per line, shared lines, video, instant messaging, and other telephony services. Feature logic manipulates lower-level functions of endpoint 12 to implement a particular state to provide the telephony features. Feature logic may be written in any suitable language such as JAVA or a text-based language such as extensible markup language (XML). The feature logic may be included in text files stored at an endpoint 12 or in web pages loaded and executed by a service framework of endpoint 12.

Feature logic may include instructions for endpoint outputs, endpoint operations, or both. An endpoint output refers to information presented through an endpoint interface, such as a sound, a light, or a display. Feature logic may instruct an output processing module to handle commands that interact with the endpoint interface. For example, a script or other feature logic may instruct an output processing module to turn on a flashing light emitting diode (LED) to indicate a waiting voicemail message.

An endpoint operation refers to an operation of endpoint 12. As an example, an endpoint operation may generate messages to an external element such as server 16 or other endpoints 12. As another example, an endpoint operation may command internal operations, such as linking multiple call legs within a conference bridge, routing a call leg to a speaker, or initiating a timer. Feature logic may instruct an operations processing module to handle commands that control the components of endpoint 12. State machines such as an output processing module and operations processing module may work in tandem to effect a procedure controlled by a command.

According to one embodiment, feature logic may include an event handler that specifies a response of endpoint 12 to an event. Events include internal events and external events, for example, input from users, other endpoints 12, or external devices. Upon detecting an event, a state machine may access a web page to determine whether the page includes an event handler for the detected event. If so, the state machine responds to the event according to the instructions within the event handler. An event handler can link to another location within the feature logic, link to another web page, or process the event.

As a specific example, an event might include a telephone being taken off-hook. The service framework may allow a user of endpoint 12 to create a feature that responds when the telephone is taken off-hook. The event may trigger a customized feature such as a customized dialtone, a displayed icon, or both. The service framework may also provide other features, such as call hold, call transfer, call pick-up, call distribution, call conferencing, video transmission, voice messaging, and instant messaging, other feature, or any combination of the preceding. In particular embodiments, the service framework may operate as an arbitrator where two or more features are triggered by an event. Thus, the service framework of endpoint 12 may arbitrate between the two state machines providing the instructions to determine which feature should intervene. One embodiment of a service framework is described in greater detail with reference to FIG. 3.

Referring to FIG. 1, switches 14 represent network equipment operable to route, translate, or both route and translate communications. Server 16 comprises any suitable combination or arrangement of logic operating to support telephony services provided by endpoints 12. Server 16 may provide a centralized repository of web pages for use by endpoints 12 to provide telephony features. Server 16 may communicate the web pages from memory 72 to endpoints 12 in response to web page requests. Server 16 may reside within endpoints 12 or in system 10.

Network 18 represents any suitable combination or arrangement of components supporting communications between endpoints 12 and server 16. For example, network 18 may include one or more local area networks (LANs), one or more wide area network (WANs), elements of a public switched telephone networks (PSTN), portions of the Internet, components of other suitable communications networks, or any combination of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of switch 14 and server 16 may be performed by one module, or the operations of server 16 may be performed by more than one module, so long as certain endpoints 12 provide proxy server features. Additionally, operations of system 10 may be performed using any suitable logic comprising software, hardware, other logic, or any suitable combination of the preceding. As used in this document, "each" refers to each member of a set or each member of a subset of a set.

Figure 2:
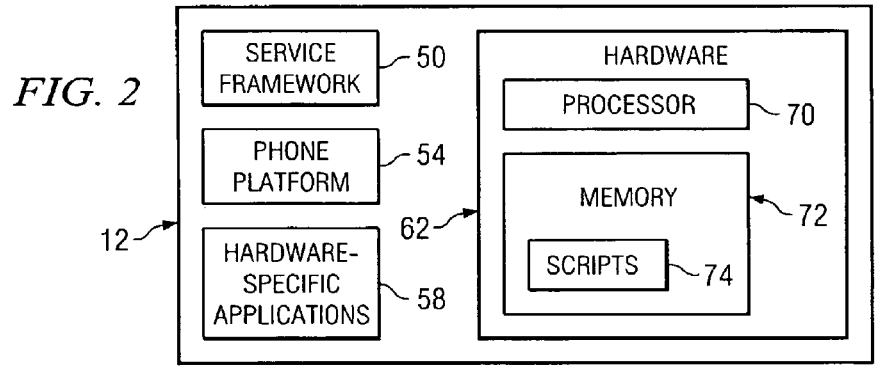
FIG. 2 is a block diagram of one embodiment of an endpoint that includes a service framework.

FIG. 2 is a block diagram of one embodiment of an endpoint 12 that includes a service framework 50. According to the illustrated embodiment, endpoint 12 includes service framework 50, a phone platform 54, hardware-specific applications 58, and hardware 62. Service framework 50 provides customizable telephony features by executing feature logic. The feature logic may be included in web pages loaded and executed by service framework 50. One embodiment of service framework 50 is described in greater detail with reference to FIG. 3.

Referring again to FIG. 2, phone platform 54 includes software that allows endpoint 12 to communicate. Phone platform 54 may include code, configuration data, applications, media, other information, or any combination of the preceding. Code represents logic executed by the elements of endpoint 12 to implement functionality. According to one embodiment, code may include logic used by a state engine to interpret and execute feature logic, such as a real-time interpreter operable to run downloaded feature logic. Phone platform 54 may include a JAVA native interface (JNI) and a JAVA virtual machine that interprets executable byte code as a JAVA application is running.

Configuration data represents settings used by endpoint 12 during initialization and operation. For example, configuration data may identify a particular server 16 from which endpoint 12 should request web pages. Applications include programs that provide underlying management and control of the operation of endpoint 12. For example, applications may include a media manager, an application manager, a property manager, a call agent, other program, or any combination of the preceding. One or more applications may be managed by an application manager. Media maintained within applications can include data such as user recorded prompts for voicemail applications, messages from other users, or other appropriate information.

Hardware-specific applications 58 include programs for controlling hardware 62. Examples of hardware-specific applications 58 include native services or native operating systems. Hardware 62 may refer to electronic, mechanical, or electromechanical components of endpoint 12. According to the illustrated embodiment, hardware 62 includes a processor 70 and a memory 72. Processor 70 manipulates data to control the operation of endpoint 12. Memory 72 stores and facilitates retrieval of information used by the processor, and may include random access memory (RAM), read only memory (ROM), magnetic drives, disk drives, compact disk (CD) drives, digital video disk (DVD) drives, removable media storage, any other suitable data storage device, or a combination of any of the preceding.

According to the illustrated embodiment, memory 72 stores scripts 74. In particular embodiments, memory 72 may store all of the feature logic required for endpoint 12 to provide telephony features. Accordingly, when an event is detected, a state machine within service framework 50 may access memory 72 to obtain a webpage with the instructions for responding to the event. In other embodiments, endpoint 12 may maintain a limited set of commonly used web pages within memory 72 and request other web pages from server 16. As such, when an event is detected, the state machine may determine whether the event is a commonly occurring event for which a webpage is maintained in memory 72. If the web page is not maintained in memory 72, the state machine may then access server 16 for the web page containing the appropriate event handler.

Hardware 62 may include other suitable components, for example, interface modules and signal processing modules. Interface modules may include user interface modules and network interface modules. User interface modules provide for the exchange of information with users of endpoint 12, and may include a speaker, a microphone, a display, an input interface, other module, or any combination of the preceding. A speaker generates audio signals, and a microphone receives and processes audio signals from a user. A display presents information to a user, and may include an LED, a graphical display, or other device for visually displaying or otherwise presenting information. An input interface represents any suitable element for receiving input from a user. For example, a user input interface may include a number keypad, one or more buttons referencing portions of display, a pointing device, other appropriate input interface, or any combination of the preceding.

Network interface modules provide for communication between endpoint 12 and other equipment. For example, a network interface may link to switch 14 and provide for packet-based voice communications. A network interface may provide for coupling to any suitable communications equipment using any appropriate techniques and protocols. A network interface may support any appropriate wireless, wireline, or both wireless and wireline communications protocol.

Signal processing modules provide for the manipulation and enhancement of signals. According to particular embodiments, signal processing modules may include digital signal processing capabilities for compression, echo cancellation, silence detection, or other appropriate signal processing.

Modifications, additions, or omissions may be made to endpoint 12 without departing from the scope of the invention. The components of endpoint 12 may be integrated or separated according to particular needs. Moreover, the operations of endpoint 12 may be performed by more, fewer, or other modules. Additionally, operations of endpoint 12 may be performed using any suitable logic comprising software, hardware, other logic, or any suitable combination of the preceding.

Figure 3:
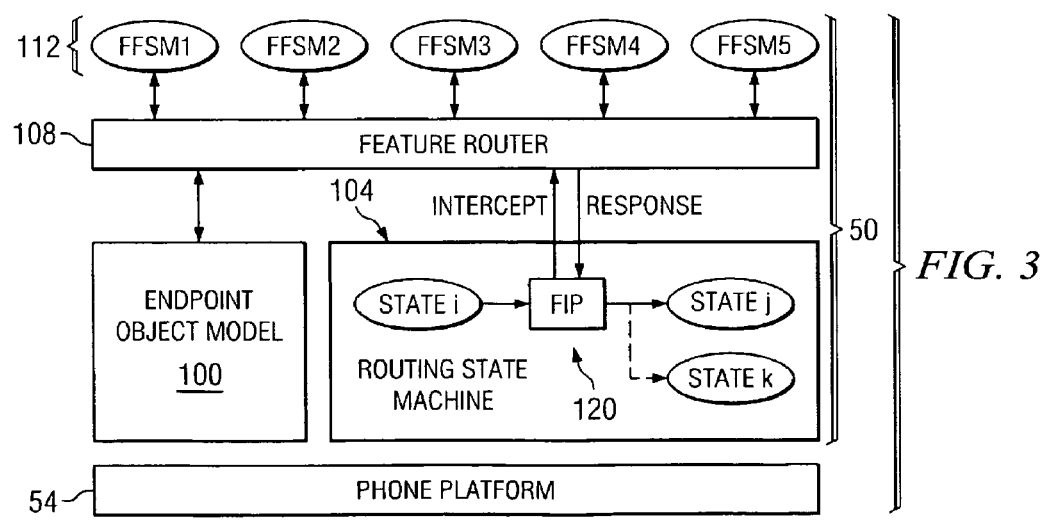
FIG. 3 is a block diagram of one embodiment of a service framework of an endpoint.

FIG. 3 is a block diagram of one embodiment of service framework 50 of endpoint 12. Service framework 50 may allow endpoint 12 to provide telephony features using any suitable method. An example method is described in more detail with reference to FIG. 5. In operation, service framework 50 exposes SIP-like primitives to direct an underlying SIP User Agent. Service framework 50 incorporates intelligent event routing in a way that helps manage feature interaction within the SIP framework.

According to the illustrated embodiment, service framework 50 includes an endpoint object model 100, one or more state machines 104, a feature router 108, and feature finite state machines (FFSMs) 112 coupled as shown. Endpoint object model 100 includes objects that have platform logic that exposes interaction points or provides a supporting function. An object represents an aspect of endpoint 12, such as a component of endpoint 12. For example, an object may represent a ringer, device, line, call, or dialog. An event occurring at an object may initiate one or more states of endpoint 12.

In general, a state machine tracks a current state and defines a next state according to a state process. A state process may refer to a process that defines the next state given a previous state and other conditions, and may be described using a state diagram. A state machine loads and executes instructions of a state process to implement the state process.

A state machine 104 is associated with an endpoint object defined by endpoint object model 100. In the illustrated embodiment, routing state machine 104 tracks the current state of phone platform 54 and defines the next state according to an endpoint state process. An endpoint state process refers to a state process that controls the operation of endpoint 12. An endpoint state process may include a feature interaction point (FIP), which refers to a point of a state process at which feature router 108 may intercept the state process and provide a response.

According to the illustrated embodiment, a state diagram 120 indicates that state i is followed by a feature interaction point. Feature router 108 intercepts the process at the feature interaction point, routes the intercept to one or more feature finite state machines that have subscribed for that intercept, determines a response from the feature finite state machines, and provides the collaborative response. Depending upon the response, the next state may be state j or state k. Example routing state machines 104 include device, line, call, and dialog state machines.

Feature router 108 coordinates feature finite state machines 112 and routing state machines 104 to provide features. Feature router 108 intercepts a state process and provides a response. Feature router 108 may determine the response according to instructions provided by feature finite state machines 112, and resolve conflicts between contradictory instructions.

In particular embodiments, feature router 108 may act as an arbitrator for resolving conflicts between event handlers. A conflict may occur if a single event triggers service framework 50 to access two or more web pages and obtain two or more sets of instructions for responding to the event. Feature router 108 allows collaboration between the multiple features that may be implicated by an event. For example, the event may include an off-hook signal. Where two features have registered for an intercept for the off-hook signal, multiple state machines may be interested in the collaboration. Thus, multiple state machines may be involved in the transition such that the transition from a first state to a second is not automatic. Rather, the features implicated may participate in the decision of which set of instructions should be implemented in response to the event.

Feature finite state machines 112 are state machines that provide instructions to implement features. A feature finite state machine 112 is notified of the current state of an endpoint state process occurring at routing state machine 104, and defines the next state according a feature state process. A feature state process may refer to a process that provides a telephony feature such as hold requests, transfer requests, multiple calls per line, shared lines, video, instant messaging, and other telephony services.

According to one embodiment of operation, feature finite state machines 112 register with feature router 108 to obtain an intercept at a specific point of a state process managed by routing state machines 104. Feature finite state machines 112 may be allowed to register for notification at specific feature interaction points. When the specific point occurs, state machine 104 provides an intercept to feature router 108, which in turn notifies feature finite state machines 112. In response, feature finite state machines 112 provide instructions to feature router 108. Feature router 108 determines a response for the event.

As described above, in certain situations, feature router 108 may receive conflicting instructions from feature finite state machines 112. Feature router 108 may resolve the conflict to determine the response according to the priority of the features. Feature router 108 then sends the response to state machine 104.

Modifications, additions, or omissions may be made to service framework 50 without departing from the scope of the invention. The components of service framework 50 may be integrated or separated according to particular needs. Moreover, the operations of service framework 50 may be performed by more, fewer, or other modules. For example, the operations of feature router 108 may be performed by more than one module, and operations of service framework 50 may be performed using any suitable logic comprising software, hardware, other logic, or any suitable combination of the preceding. Additionally, although service framework 50 is described as being a component of endpoint 12, it is recognized that, in some embodiments, service framework 50 may be incorporated into a remote node that is external to and independent from endpoint 12.

Figure 4:
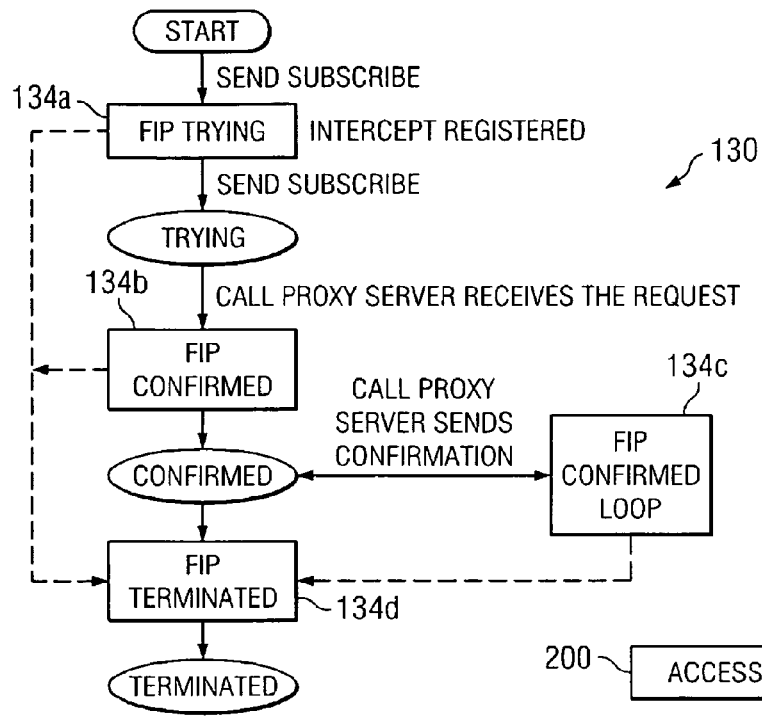
FIG. 4 is a block diagram of one embodiment of a state process for a subscribe request.

FIG. 4 is a block diagram of one exemplary embodiment of a state process 130 for a subscribe request. According to a default telephony feature described by state process 130, the subscribe request is initiated at endpoint 12 and is communicated to a call proxy server. The call proxy server authenticates the subscribe request and provides a confirmation to endpoint 12. In the illustrated embodiment, state process 130 includes feature interception points (FIPs) 134 at which a feature may intercept process 130. For example, one or more features may intercept process 130 at FIP 134a, when endpoint 12 is trying to register by sending the subscribe request. The subscribe request triggers processing by feature router 108 and. Feature router 108 may then intercede to determine the priority among the features requesting the intercept and the default action involving the call proxy server. The feature router 108 determines that a particular feature has a higher priority and applies the instructions associated with the particular feature.

Although a state process for processing a subscribe request is illustrated and described, it is generally recognized that illustrated state process is merely one example of a state process that may be implemented by a routing state machine. The state process may include a refer request, an invite request, or any other appropriate state process for providing telephony services.

Figure 5:
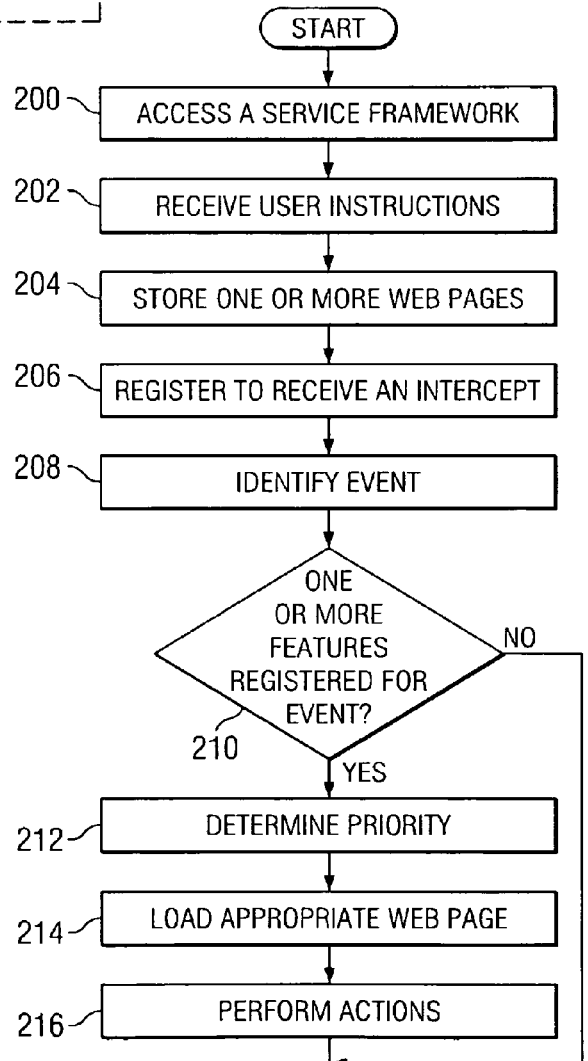
FIG. 5 is a flowchart of one embodiment of a method for providing telephony features at an endpoint.

FIG. 5 is a flowchart of one embodiment of a method for providing telephony features using endpoint 12 of FIG. 1. According to the embodiment, endpoint 12 has a service framework 50 that includes one or more feature finite state machines 112 that provide telephony features.

The method begins at step 200, where a service framework 50 is provided at endpoint 12. Service framework 50 may be substantially similar to the service framework 50 described above with regard to FIG. 3. In particular embodiments, service framework 50 provides an interface through which user instructions may be received at step 202. The user instructions may include requests for telephony features, which may include customized services relating to, for example, hold requests, multiple calls per line, or shared lines. The user instructions may include modifications to default behavior of endpoint 12 for basic call and key features.

One or more feature finite state machines 112 are stored in memory 72 of endpoint 12 at step 204. The feature finite state machines 112 may be comprised of feature logic that provides actions and instructions to endpoint 12. According to one embodiment, each script is associated with a telephony feature. The script may include an event handler that identifies the occurrence of an event in response to which the actions included in the script may be performed.

At step 206, a telephony feature is registered to receive an intercept at the occurrence of an event. In particular embodiments, the registration of the telephony feature may be at the direction of a user through the interface provided at endpoint 12. The registration of the telephony feature may indicate the user's desire to invoke a feature which is provided by a feature finite state machine 112 that overrides default telephony feature behavior typically performed by endpoint 12 upon the occurrence of a specified event.

The occurrence of an event is identified at step 208. In response to identifying the event, service framework 50 of endpoint 12 may determine, at step 210, whether one or more telephony features is registered to receive an intercept at the occurrence of the identified event. If one or more telephony features are registered to receive an intercept, priority between the registered telephony features is determined upon the occurrence of the event at step 212.

For example, where just one telephony feature is registered to receive the intercept, the subscribing telephony feature will be notified and be given an opportunity to override the default behavior of the platform process. As another example, where more than one telephony feature is registered to receive the intercept, the priority between the telephony features is determined. The feature logic associated with the feature having priority may then be loaded first at step 214. Features of lower priority will then be loaded in sequence until a feature elects to break the chain. The actions included in the loaded feature logic may then be performed at step 216. In this manner, the actions may have been collaboratively arrived at by all members in the feature chain that were notified.

Modifications, additions, or omissions may be made to the method without departing from the scope of the invention. The method may include more, fewer, or other steps. Additionally, steps may be performed in any suitable order without departing from the scope of the invention.

A technical advantage of one embodiment may be that integrated service features may be provided at an endpoint. In particular embodiments, the endpoint may include an interface to the Internet through a service framework. Users of the endpoint may use the service framework interface to enhance or modify default platform behavior in a way that creates call and key features. Another technical advantage may be that the endpoint may support services implemented using feature logic. Accordingly, logic instructions may be created at a user's request. A further technical advantage may be that the logic instructions may operate to provide customized features with respect to hold requests, transfer requests, multiple calls per line, shared lines, video, instant messaging, and other telephony services.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for providing telephony features at an endpoint, comprising:
    accessing a service framework configured at an endpoint comprising a telephone, the service framework operable to provide one or more telephony features;
    accessing feature logic associated with a first telephony feature, the feature logic specifying a plurality of actions for implementing the first telephony feature;
    storing the feature logic at the endpoint;

registering the first telephony feature with a state machine located at the endpoint to allow the first telephony feature at the endpoint to receive an intercept upon the occurrence of an event at an interception point of a state process occurring at the endpoint;

identifying, at the endpoint, the occurrence of the event for which the first telephony feature is registered, the event initiating a transition from a first state to a second state;

in response to identifying the occurrence of the event, determining whether the endpoint is maintaining a webpage for responding to the event; and in response to the determination:
   accessing the webpage at the endpoint to respond to the event if the endpoint is maintaining the webpage; and
   accessing a server to obtain the webpage to respond to the event if the endpoint is not maintaining the webpage.

2. The method of claim 1, further comprising receiving feature development instructions through an interface associated with the service framework, the feature development instructions directing the creation of the one or more telephony features.

3. The method of claim 1, further comprising:
   accessing the feature logic associated with a second telephony feature, the feature logic specifying a plurality of actions for implementing the second telephony feature; and
   registering the second telephony feature to receive an intercept upon the occurrence of the event.

4. The method of claim 1, further comprising:
   determining priority between the first telephony feature registered to receive the intercept and a second telephony feature registered to receive the intercept;
   loading the feature logic associated with the first telephony feature if the first telephony feature has priority over the second telephony feature; and
   otherwise, loading the feature logic associated with the second telephony feature.

5. The method of claim 1, further comprising:
   determining that the feature logic associated with the first telephony feature includes an event handler; and
   matching the event handler to the event.

6. The method of claim 1, wherein an action of the feature logic associated with the first telephony feature specifies an output corresponding to a particular state of the first telephony feature.

7. The method of claim 1, wherein the feature logic associated with the first telephony feature is accessed using a first web page.

8. The method of claim 1, wherein the feature logic comprises a script that includes a plurality of text commands.

9. A computer readable medium encoded with computer executable instructions, the instructions operable to:
   access a service framework at an endpoint, the service framework operable to provide one or more telephony features;
   access feature logic associated with a first telephony feature, the feature logic specifying a plurality of actions for implementing the first telephony feature;
   register the first telephony feature with a state machine located at the endpoint to allow the first telephony feature at the endpoint to receive an intercept upon the occurrence of an event at an interception point of a state process occurring at the endpoint;
   identify the occurrence of the event for which the first telephony feature is registered, the event initiating a transition from a first state to a second state;
   in response to identifying the occurrence of the event, determine whether the endpoint is maintaining a webpage for responding to the event; and
   in response to the determination:
      access the webpage at the endpoint to respond to the event if the endpoint is maintaining the webpage; and
      access a server to obtain the webpage to respond to the event if the endpoint is not maintaining the webpage.

10. The computer readable medium of claim 9, further operable to:
   receive feature development instructions through an interface associated with the service framework, the feature development instructions directing the creation of the one or more telephony features.

11. The computer readable medium of claim 9, further operable to:
   accessing the feature logic associated with a second telephony feature, the feature logic specifying a plurality of actions for implementing the second telephony feature; and
   register the second telephony feature to receive an intercept upon the occurrence of the event.

12. The computer readable medium of claim 9, further operable to:
   determine priority between the first telephony feature registered to receive the intercept and a second telephony feature registered to receive the intercept;
   load the feature logic associated with the first telephony feature if the first telephony feature has priority over the second telephony feature; and
   otherwise, loading the feature logic associated with the second telephony feature.

13. The computer readable medium of claim 9, further operable to:
   determine that the feature logic associated with the first telephony feature includes an event handler; and
   match the event handler to the event.

14. The computer readable medium of claim 9, wherein an action of the feature logic associated with the first telephony feature specifies an output corresponding to a particular state of the first telephony feature.

15. The computer readable medium of claim 9, wherein the feature logic associated with the first telephony feature is accessed using a first web page.

16. The computer readable medium of claim 9, wherein the feature logic comprises a script that includes a plurality of text commands.

17. An endpoint for providing telephony features, comprising:
   a service framework operable to provide one or more telephony features; and
   a memory operable to store feature logic associated with a first telephony feature, the feature logic specifying a plurality of actions for implementing the first telephony feature;
   wherein the service framework is further operable to:
      register the first telephony feature with a state machine located at the endpoint to allow the first telephony feature at the endpoint to receive an intercept upon the occurrence of an event at an interception point of a state process occurring at the endpoint;
      identify the occurrence of the event for which the first telephony feature is registered, the event initiating a transition from a first state to a second state;
      in response to identifying the occurrence of the event, determine whether the endpoint is maintaining a webpage for responding to the event; and in response to the determination:
    access the webpage at the endpoint to respond to the event if the endpoint is maintaining the webpage; and
    access a server to obtain the webpage to respond to the event if the endpoint is not maintaining the webpage.

18. The endpoint of claim 17, wherein the integrated service framework is further operable to:
    receive feature development instructions through an interface associated with the service framework, the feature development instructions directing the creation of the one or more telephony features.

19. The endpoint of claim 17, wherein the integrated service framework is further operable to:
    access the feature logic associated with a second telephony feature, the feature logic specifying a plurality of actions for implementing the second telephony feature; and
    register the second telephony feature to receive an intercept upon the occurrence of the event.

20. The endpoint of claim 17, wherein the integrated service framework is further operable to:
    determine priority between the first telephony feature registered to receive the intercept and a second telephony feature registered to receive the intercept;
    load the feature logic associated with the first telephony feature if the first telephony feature has priority over the second telephony feature; and
    otherwise, load the feature logic associated with the second telephony feature.

21. The endpoint of claim 17, wherein the integrated service framework is further operable to:
    determine that the feature logic associated with the first telephony feature includes an event handler; and
    match the event handler to the event.

22. The endpoint of claim 17, wherein an action of the feature logic associated with the first telephony feature specifies an output corresponding to a particular state of the first telephony feature.

23. The endpoint of claim 17, wherein the feature logic associated with the first telephony feature is accessed using a first web page.

24. The endpoint of claim 17, wherein the feature logic comprises a script that includes a plurality of text commands.

* * * * *